United States Patent [19]

Young

[11] 4,254,251

[45] Mar. 3, 1981

[54] NOVEL PRESSURE SENSITIVE ADHESIVES

[76] Inventor: David W. Young, 18508 Clyde Rd., Homewood, Ill. 60430

[21] Appl. No.: 110,072

[22] Filed: Jan. 7, 1980

[51] Int. Cl.$^3$ ............................................. C08F 283/00
[52] U.S. Cl. .................................... 525/451; 525/401; 528/246
[58] Field of Search ................. 525/401, 451; 528/246

[56] References Cited

U.S. PATENT DOCUMENTS 4,074,061   2/1978   Musser ............................. 528/246 X Primary Examiner—Lucille M. Phynes
Attorney, Agent, or Firm—E. Janet Berry

[57] ABSTRACT

The invention is for the preparation and use of novel compositions and formulations of pressure sensitive adhesives for solid surfaces and which are especially adapted for use on both flexible and rigid plastic surfaces. Both the compositions and the adhesive formulations are considered to be novel and contain, among other components and ingredients, acrylic and methacrylic ester formals. The new formulations have been shown to have superior properties in a number of critical areas all of which are of great importance and provide advantages for the pressure sensitive adhesives.

6 Claims, No Drawings

NOVEL PRESSURE SENSITIVE ADHESIVES

This invention relates generally to the preparation and use of novel acrylic and methacrylic ester formals which have been found useful in the formulation of novel products which are pressure sensitive adhesives. These pressure sensitive adhesives are generally useful for application to soild surface substrates and are especially useful for use on both flexible and rigid plastic substrates.

There are a great many industrial uses for these novel formulations of pressure sensitive adhesives. They can advantageously and conveniently be employed on all types of rigid plastics such as high molecular weight polybutene-1 resin and particularly with the types of resins which are widely used to make plastic pipe. The adhesives are also widely useful for the bonding of all kinds of plastic pipe including such products as those made from polyvinylchloride, polyethylene, polypropylene, polybutene-1 and ABS and polyester resin and combinations of products made from these materials.

These adhesives and their formulations have also been found satisfactory for bonding all kinds of paper and cellulose containing materials such as for bonding photographs to flexible plastics, for example, to polyester or other film. It is also possible to use the adhesives to bond paper to metals, paper to resins, as well as for bonding both similar and dissimilar resins and plastics to each other.

As further example, the pressure sensitive acrylic resins have been found highly useful in a wide variety of applications. They can be used to apply decals and labels, for decorative vinyls such as wall and floor tiles, for appliance and automotive parts and in many household (consumer) type as well as industrial products.

A number of acrylic and methacrylic ester formals were prepared and their properties studied in connection with the formulation of pressure sensitive adhesives.

The final generic structures for the compounds of the invention may be defined as follows:

$$R-O-CH_2-O-R$$

In this formula R represents radicals which are the esters of acrylic or methacrylic acids reacted with organic hydroxy compounds less the reacting hydrogen atoms. These radicals may contain from 4 up to about 50 to 60 carbon atoms. The R group is selected such that the total number of carbon atoms in the ester formal molecules is between 20 and 200.

More particularly, the ester formals of the invention are derived from either acrylic acid or methacrylic acid reacted with an organic hydroxy compound which contains at least two free alcoholic hydroxy groups. After the ester has been formed between the unsaturated acid and the polyhydric alcohol, the resulting compounds are reacted with formaldehyde to produce the final formal product.

More specifically, the chemistry of the preparation of the acrylic acid formal (hereafter referred to as A-F) may be schematically shown as follows:

a. Structure of Acrylic Acid
   $$CH_2=CH-COOH$$
b. Chemical Formulas:

1. Step 1: Polymer $$CH_2=CH-COOH \xrightarrow{\text{(Benzoyl Peroxide)}}$$
   $$(CH=CH-COOH)_n$$
   (R)

2. Step 2: Ester $$R + HO-CH_2-CH_2-OH \xrightarrow{\text{(Zinc Stearate)}}$$
   $$H_2O + (CH=CHCOO-CH_2CH_2-OH)_n$$
   (R)

3. Step 3: Formal $$2(ROH) + H_2C=O \xrightarrow{\text{(Sulfuric Acid)}} RO-\overset{H}{\underset{H}{C}}-OR$$

The chemistry of the preparation of the methacrylic acid formal (hereafter referred to as MA-F) may be schematically shown as follows:

a. Structure of Methacrylic Acid
   $$CH_2=\underset{\underset{CH_3}{|}}{C}-COOH$$

b. Chemical Formulas:
1. Step 1: Polymer $$CH_2=\underset{\underset{CH_3}{|}}{C}-COOH \xrightarrow{\text{(Benzoyl Peroxide)}}$$
   $$\left( CH=\underset{\underset{CH_3}{|}}{C}-COOH \right)_n$$
   (R)

2. Step 2: Ester $$R + HO-CH_2-CH_2-OH \xrightarrow{\text{(Zinc Stearate)}}$$
   $$\left( CH=\underset{\underset{CH_3}{|}}{C}-COO-CH_2-CH_2-OH \right)_n$$
   (R)

3. Step 3: Formal $$2(ROH) + H_2C=O \xrightarrow{\text{(Sulfuric Acid)}}$$
   $$RO-\overset{H}{\underset{H}{C}}-OR$$

In general the preparation of the complex formals of the invention is accomplished by methods that require conventional techniques and methods for preparation of chemical compounds.

The acrylic or methacrylic acid which is used for the acidic portion of the polymeric ester is employed in the first step in what is a polymerization reaction. The polymerization of the selected unsaturated acid is carried out using a peroxide type catalyst, for example, one preferred catalyst is benzoyl peroxide. The polymer so formed preferably has a Standinger Molecular weight of about 10,000 to 50,000.

In the second step, this polymer is reacted with a polyhydric alcohol from the group of glycols such as ethylene glycol, 1,2-propanediol, 1,3-propanediol, 1,3-butanediol, 1,4-butanediol, 1,5-pentanediol, and polyethylene glycols such as diethylene glycol, triethylene glycol, tetraethylene glycol, dipropylene glycol, tripropylene glycol, 1,2-cyclohexanediol, and decanediol-1,10, including other polyhydric alcohols such as glycerol, 2-hydroxymethyl-2-methyl-propanediol-1,3, pentaerythritol, sorbitol, dipentaerythritol, dulcitol, trimethylol propane, tetramethylol cyclohexanol and benzotrimethylol.

The reaction to form the polymeric ester is carried out in the presence of a wetting agent and/or conventional esterifying agents.

Temperatures ranging from 30° to 200° C. can be employed and the time of reaction can vary from 3 hrs. to 30 hrs. depending on reactivity of the reaction components.

Formaldehyde in aqueous solution or any of the polymers of formaldehyde such as paraformaldehyde is refluxed with the polymer material containing the hydroxyl group or groups. Acidic materials such as hydrochloric acid, sulfuric acid, sulfamic acid, p-toluene-sulfonic acid, sodium acid sulfate, phosphoric acid, phosphoric acid deposited on a silica containing compound such as kieselguhr, ion exchange resins or any inorganic acidic substance may be used as catalyst.

In carrying out the reaction to produce the formal, it is necessary to employ at least 2 moles of the hydroxy-compound to one mole of the formaldehyde.

The unique and novel products which are produced by the process of the invention have been found to show highly desirable performance having superior and desirable properties for preparing pressure sensitive adhesives. The tests carried out on these products are detailed hereinbelow. Results from the testing indicates that the formulations prepared from the products possess excellent creep resistance, resistance to plasticizer migration, high shear strength, resistance to high temperatures and light stability.

The products have been found to be highly useful as adhesive compositions either alone or formulated with other known materials. They can be used on both flexible and rigid plastics for coatings and sealants.

The adhesive products disclosed herein may also be advantageously employed to bond pipe and tubing made from polyvinyl chloride, ABS polymers, polystyrene, polybutene-1 and similar polymers. They may also be employed on the polyethylenes and polypropylenes as substrates.

The invention will be described in greater detail by the Examples shown below but it is not intended to limit the invention thereto.

EXAMPLES

Example I. Preparation of Acrylic Ester Formal (A-F)

A polymer having a Staudinger molecular weight of about 12,100 was made as described in Step 1 above, using the following:

500 Parts by weight acrylic acid
500 Parts by weight ethyl acetate (solvent/diluent)

Benzoyl peroxide in 0.05 parts (by formula weight) was employed as the polymerization catalyst. The polymerization was conducted under reflux at the boiling point of the mixture. The course of the polymerization was followed by solvent evaporation, under reduced atmospheric pressure (to insure against polymer degradation). A highly viscous, tacky polymer was produced. The reaction time at the boiling point was six (6) hours. Yield was 100%.

The resulting polymerizate was then dissolved in warm benzene at a 10% by weight concentration. This mixture was reacted with one (1) mole of ethylene glycol to produce the acrylic acid/ethylene glycol ester described in Step 2 above. This mixture was then heated under reflux to remove the water formed as a reaction by-product. Zinc stearate was used in a concentration of 0.1 grams in the mixture as the esterification catalyst. The reaction time was 7.5 hours and the yield was 92%.

Following the esterification, one (1) mole of formaldehyde was added to the ester mixture obtained as above, using 1.0% by weight sulfuric acid as the catalyst, to produce the acrylic acid formal (A-F) described in Step 3 above. The reaction product was refluxed to remove water. The reaction time was four (4) hours and the yield was 92%.

This three-step process yielded a colorless semi-solid product with a molecular weight (Staudinger) of 24,200 (A-F). The formal is highly soluble in an equal mixture of a heptane/isopropyl alcohol/ethyl acetate solvent system. 30% to 40% (by weight) of the polymer was solvated in this solvent system.

Example 2. Preparation of Methacrylic Ester Formal (MA-F)

The procedures, conditions, catalysts, solvents and reactions were similar to those used for A-F and described in the above procedure of Example 1.

A polymer having a Staudinger molecular weight of about 28,000 was produced as described in Step 1 above, using the raw materials:

500 Parts by weight methacrylic acid
500 Parts by weight ethyl acetate (solvent/diluent)

The resulting formal as described in Step 3 above was a semi-solid, odorless, colorless product with a Staudinger molecular weight of 56,000 (MA-F). This formal is highly soluble in an equal mixture of heptane/isopropyl alcohol/ethyl acetate solvent system. 30% to 40% (by weight) of formal was solvated in this solvent system.

Example 3. Testing Results

The formal products of both Examples 1 and 2 above were tested by peeling, shrinking, loop tacking and thumb tacking tests. The effect of accelerated aging on peel strength and Williams plasticity were also tested. The results are reported in Tables I through VII below.

For comparative testing purposes, Monsanto's Gelva Adhesive RA-1159 was selected. This product is an acrylic based formulation designed primarily for use in pressure sensitive adhesive applications.

All testing conducted on Monsanto RA-1159, and on the invention products A-F, and MA-F conform to those procedures outlined in Monsanto Publication No. 6358A, *Guide for Gelva Multipolymer Solutions in Pressure-Sensitive Adhesives*, at Pages 11 through 16.

TABLE I

| PEEL TESTS | | | |
|---|---|---|---|
| I: Peel Test Using Polyester Mylar Film | | | |
| | Monsanto(a) RA-1159 | A-F | MA-F |
| Time of Dwell: | 20 min. | 20 min. | 20 min. |
| Type of Bond: | Cohesive | Cohesive | Cohesive |
| lbs/in. Width: | 6.6 | 8.7 | 9.8 |
| II: Peel Test Using Poly(Vinyl Chloride) Film | | | |
| | Monsanto(a) RA-1159 | A-F | MA-F |
| Time of Dwell: | 20 min. | 20 min. | 20 min. |
| Type of Bond: | Cohesive | Cohesive | Cohesive |

TABLE I-continued
PEEL TESTS

| lbs/in. Width: | 6.6 | 8.7 | 9.8 |
|---|---|---|---|

NOTE:
Results (in lbs/in width) were identical to results shown in I and II above, using a 24 hour dwell time.
It is to be noted that the values of 8.7 for A-F and 9.8 for MA-F are strikingly and unexpectedly better than the value of 6.6 for the comparable commercial Monsanto product.
(a)Monsanto, Guide for Gelva Multipolymer Solutions in Pressure-Sensitive Adhesives, No. 6358A, Page 12.

TABLE II
EFFECT OF ACCELERATED AGING ON PEEL STRENGTH
I. Results Using Release Paper Sandwich

|  | Monsanto(b) RA-1159 | A-F | MA-F |
|---|---|---|---|
| Results in lbs/in. Width |  |  |  |
| Minimum | 5.5 | — | — |
| Maximum | 5.5 | — | — |
| Average | 5.5 | 7.3 | 9.7 |

The adhesive tests for the invention materials are again suprisingly better than those for the product used as the test standard.

II. Results Using Poly(Vinyl Chloride) Film

|  | Monsanto(b) RA-1159 | A-F | MA-F |
|---|---|---|---|
| Results in lbs/in. Width |  |  |  |
| Minimum | 6.0 | — | — |
| Maximum | 6.2 | — | — |
| Average | 6.1 | 8.2 | 11.8 |

Once again, these tests clearly show the superiority of the values of 8.2 and 11.8 obtained as the results of tests on the invention products
(b)Monsanto, Guide for Gelva Multipolymer Solutions in Pressure-Sensitive Adhesives, No. 6358A, Pages 12 and 13.

TABLE III
LOOP TACK TEST

| Film Type: | Monsanto(c) RA-1159 | A-F | MA-F |
|---|---|---|---|
| Polyethylene | 5.0 | 7.0 | 7.0 |
| Ethylene Ethyl Acrylate | 4.3 | 7.0 | 6.6 |
| Ethylene Maleic Anhydride | 5.0 | 8.4 | 9.1 |
| Poly(vinyl chloride) | 6.1 | 6.2 | 6.3 |
| Polyester Mylar | 5.9 | 7.0 | 7.1 |

NOTE:
The above are average values of three (3) samples and results report in lbs/in width. The A-F and MA-F products both give improved results as compared to the Monsanto product used as the standard.
(c)Monsanto, Guide to Gelva Multipolymer Solutions in Pressure-Sensitive Adhesives, No. 6358A, Page 13.

TABLE IV
THUMB TACK TEST

|  | Monsanto(d) RA-1159 | A-F | MA-F |
|---|---|---|---|
| Release Paper | 6 | 9 | 10 |

NOTE:
The above test is a qualitative one, and the results represent relative numbers on a scale of 1 to 10, with 10 representing the highest value.
(d)Monsanto, Guide for Gelva Multipolymer Solutions in Pressure-Sensitive Adhesives, No. 6358A, Page 14.

TABLE V
CREEP TESTS

|  | Monsanto(e) RA-1159 | A-F | MA-F |
|---|---|---|---|
| Creep Time in Min. | 27 | 58 | 137 |

NOTE:
The above are average values of three (3) samples tested, each.
(e)Monsanto, Guide for Gelva Multipolymer Solutions in Pressure-Sensitive Adhesives, No. 6358A, Page 14.

TABLE VI
SHRINK TEST

|  | Monsanto(f) RA-1159 | A-F | MA-F |
|---|---|---|---|
| % Shrinkage | 6.1 | 6.8 | 6.0 |

(f)Monsanto, Guide for Gelva Multipolymer Solutions for Pressure-Sensitive Adhesives, No. 6358A, Page 14-15.

TABLE VII
WILLIAMS PLASTICITY

|  | Monsanto(g) RA-1159 | A-F | MA-F |
|---|---|---|---|
| Results in mm. | 2.3 | 3.1 | 3.9 |

(g)Monsanto, Guide for Gelva Multipolymer Solutions for Pressure-Sensitive Adhesives, No. 6358A, Page 15.

What is claimed is:

1. As an adhesive, the composition of matter, an acrylic ester formal corresponding to the formula:

$$R-O-\underset{\underset{H}{|}}{\overset{\overset{H}{|}}{C}}-O-R$$

in which R is $-(CH=CH-COO-CH_2CH_2-OH)_n$ and in which n is a number from 4 to 60.

2. As an adhesive, the composition of matter, a methacrylic ester formal corresponding to the formula:

$$R'-O-\underset{\underset{H}{|}}{\overset{\overset{H}{|}}{C}}-O-R'$$

in which R' is $$-(CH=\underset{\underset{}{|}}{\overset{\overset{CH_3}{|}}{C}}-COO-CH_2-CH_2-OH)_n$$

and in which n is a number from 4 to 60.

3. The process for making an acrylic acid ester formal which comprises the steps of (1) reacting an acrylic acid with a polyhydric aliphatic alcohol and (2) reacting the product resulting therefrom with formaldehyde to produce a complex formal.

4. The process of claim 3 in which acrylic acid is the acrylic acid used and ethylene glycol is the polyhydric aliphatic alcohol used.

5. The process of claim 3 in which methacrylic acid is the acrylic acid used and ethylene glycol is the polyhydric aliphatic alcohol used.

6. The method for providing an adhesive surface to plastics which comprises applying thereto an effective amount of an acrylic acid ester formal.

* * * * *